Patented July 7, 1942

2,288,736

UNITED STATES PATENT OFFICE 2,288,736

COMPOSITION FOR ASSURING CONFORMITY OF MOLDING COMPOSITIONS TO WAX PATTERNS

Harold A. Osserman, New York, N. Y.

No Drawing. Application June 3, 1940,
Serial No. 338,584

3 Claims. (Cl. 22—189)

This invention relates to compositions for use in the preparation of molds or castings, and relates more particularly to compositions for painting wax patterns prior to the preparation of molds therefrom, and for use in conjunction with investment and molding compositions for assuring accuracy in duplicating the shape and size of wax patterns in the casting of jewelry, dental castings, and other metallic and non-metallic parts which are first modeled in wax.

By way of example of the procedure followed in casting small metallic parts which are first modeled in wax, in preparing a filling for a tooth, such as for example, a gold inlay, a wax impression of the cavity in the tooth is usually made. The impression is then coated with an investment material, such as the compositions disclosed in the U. S. patents to Coleman et al., No. 1,932,202; Dailey, Nos. 1,901,052, 1,901,053 and 1,901,054; and Moore No. 1,924,874, which upon hardening is heated to boil or melt out the wax impression, leaving a cavity corresponding in shape to the cavity in the tooth. Molten metal is then forced into the cavity in the investment and cooled to produce an inlay which should fit the cavity in the tooth exactly.

There are several factors entering into the preparation of the inlays and other metallic elements which sometimes prevent the exact duplication in the elements of the size and shape of the original wax pattern. The investment or mold-forming composition often fails to make uniform contact with the wax pattern, and for that reason, the mold cavity in the investment differs in shape from the wax pattern. Moreover, as the investment hardens, heat is generated by the reaction in the material, with the result that the wax pattern may become somewhat plastic and will change slightly in shape, thus allowing the cavity in the investment to become distorted.

An object of the present invention is to provide compositions which will assure uniform and complete contact between investment and mold-forming compositions and the wax pattern.

Another object of the invention is to provide compositions for painting wax patterns to cause an investment or mold-forming composition to engage the pattern closely and uniformly and assure the formation of a cavity in the completed mold of the exact shape and size of the wax pattern.

Another object of the invention is to provide a composition for painting wax patterns which will reduce the temperature change of an investment composition during setting and thereby prevent distortion of the wax pattern during the preparation of the mold.

A further object of the invention is to provide investment and molding compositions for preparing molds which cause the compositions to conform accurately to a wax pattern and to reduce the tendency of such compositions to increase in temperature during hardening.

Other objects of the invention will become apparent from the description of typical forms of compositions embodying the present invention.

In accordance with the present invention, I have provided a composition which has a wetting and surface tension reducing action. This composition, upon application to a wax pattern, either as a painting solution or as a component of an investment or mold-forming composition, eliminates the tendency of the wax pattern to repel the composition, thereby assuring intimate contact of the investment with the pattern and duplication of the surface formation of the pattern.

When a wax pattern is painted with my composition, a layer of solution having a low surface tension is left on the pattern. The investment or molding composition penetrates this layer of solution and is distributed uniformly over every portion of the pattern. The solution is then absorbed by the molding or investment composition and reacts with the composition to reduce the generation of heat during setting of the composition.

More particularly, my novel composition includes as a wetting and hygroscopic agent such compositions as the polyhydroxy alcohols and their derivatives. Such polyhydroxy alcohols and ethers and esters of polyhydroxy alcohols as glycerin, sorbitol, glycol, propylene glycol, carbitol, methyl carbitol and butyl carbitol have proven to be entirely satisfactory as wetting agents.

The surface tension depressant must be of organic nature and I have found that the compositions known as "Aerosol" O. T. (sodium dioctyl sulfo-succinate), the aryl alkyl sodium sulfonates known as "Nacconol," as well as other aryl alkyl sodium sulfonates, such as, for example the alkyl naphthalene sodium sulfonates, have given the most satisfactory results.

Minor proportions of the wetting and hygroscopic agents and one or more of the surface tension depressants of the above types may be mixed with water to provide a solution for painting the wax impressions or for mixing directly with the investment or molding composition.

The amount of the surface tension depressant used may vary between 1 and 10% by weight of the total solution. I have found that the best results are obtained by using about 2% by weight in the solution.

The proportion of the wetting agent may also be varied within wide limits, namely between about 1% and 20%. I have found that about 4% of the wetting agent gives entirely satisfactory results.

A typical solution for painting wax impressions contains:

"Aerosol" O. T. (sodium dioctyl sulfo-succinate)—One part by weight.
Glycerin—Two parts by weight.
Water—Forty-seven parts by weight.

When the "Aerosol" is dissolved in the water, it forms a cloudy, bluish, soapy appearing solution. In order to obtain a clear solution, a small quantity of carbitol may be added.

A typical, clear solution, containing Aerosol O. T. is, as follows:

"Aerosol" O. T. (sodium dioctyl sulfosuccinate)—One part by weight.
Carbitol—One part by weight.
Glycerin—Two parts by weight.
Water—Forty-six parts by weight.

Similar clear solutions can be obtained by substituting propylene glycol in similar proportions for the carbitol.

Solutions of the type disclosed above have a tendency to froth somewhat on agitation and while this characteristic in no way affects their action, it may be minimized by including an antifrothing agent, such as, for example, octyl alcohol in the proportion of 3 drops to 50 c. c. of the above solution to improve the appearance of the solution.

The above examples of my composition preferably should be prepared with distilled water but undistilled water may be used if desired.

When chlorinated water is used in preparing the investment material, I have found that the "Nacconols" (aryl alkyl sodium sulfonates) are more satisfactory than "Aerosol" O. T. The "Nacconols" may be used with distilled or undistilled water and may be substituted in all cases in amounts similar to the amount of "Aerosol" used in the above examples.

Compositions of the type disclosed above decrease the water repellent action of the wax pattern and assure intimate contact between the investment and the pattern. Moreover, for some reason not understood, these solutions reduce the reaction temperature of the investment composition, limiting it to an increase, in most instances, of not over 1°, which is insufficient to adversely affect the shape of the wax pattern.

These solutions may be prepared in more concentrated form if desired, and may be mixed with additional water for dental painting purposes. They also act as lubricants for the dental dies, thus facilitating the relative movement of the die elements and they may be used as detergents for the mold elements.

While I prefer to use the above described solutions to paint the wax patterns, similar results may be obtained by mixing the solutions with the investment or molding compositions. For example, when using an investment composition of the type disclosed in the Coleman et al. Patent No. 1,932,202, the following proportions of ingredients may be used:

40 grams of a mixture of:

| | Part |
|---|---|
| Plaster of Paris | 30 |
| Cristobalite | 50 |
| Tridymite and ordinary silica | 20 |

Is mixed with

| | Grams |
|---|---|
| Water | 20 to 2 |
| An aryl alkyl sodium sulfonate | .03 |
| Sodium boroformate | .03 |

The sodium boroformate is a buffering agent which is used to compensate for variation in the pH value of the water used in the mixture. If the water is not chlorinated, "Aerosol O. T." and a wetting agent may be substituted for the "Nacconol."

While I have disclosed my invention, with reference to certain specific examples of the compositions which have been found to be most satisfactory, it will be understood that the compositions can be varied considerably in the type of wetting and hygroscopic agent and the surface tension depressant, without departing from the invention, so long as the composition has the property of causing the investment material to conform closely to the surface of the impression. Therefore, the examples given above should be considered as illustrative only and not as limiting the scope of the following claims:

I claim:

1. A painting solution for application to wax patterns for assuring intimate contact between said patterns and an investment composition comprising a solution containing between about 1% and 20% of a polyhydroxy alcohol, about 1% to 10% of at least one of the group of surface tension depressants consisting of sodium dioctyl sulpho-succinate and aryl-alkyl sodium sulfonates, and the remainder water.

2. A painting solution for application to wax patterns for assuring intimate contact between said patterns and investment compositions comprising an aqueous solution containing about 2% by weight of sodium dioctyl sulpho-succinate and about 4% glycerine.

3. A painting solution for application to wax patterns for assuring intimate contact between said patterns and investment compositions comprising an aqueous solution containing about 2% by weight of aryl-alkyl sodium sulfonate and about 4% glycerine.

HAROLD A. OSSERMAN.